(12) United States Patent
Leavitt et al.

(10) Patent No.: US 10,887,463 B1
(45) Date of Patent: Jan. 5, 2021

(54) METHOD OF USING MULTI-DIMENSIONAL PRESENCE MODEL TO MANAGE CALL-CENTER AGENT LOAD

(71) Applicant: Talkdesk, Inc., San Francisco, CA (US)

(72) Inventors: Doug Leavitt, San Francisco, CA (US); Mariana Rabaçal, Lisbon (PT); Ricardo Oliveira, Oporto (PT)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/670,223

(22) Filed: Oct. 31, 2019

(51) Int. Cl.
*H04M 3/523* (2006.01)
*H04M 3/51* (2006.01)

(52) U.S. Cl.
CPC ....... *H04M 3/5232* (2013.01); *H04M 3/5191* (2013.01)

(58) Field of Classification Search
None
See application file for complete search history.

(56) References Cited

U.S. PATENT DOCUMENTS

| | | | | |
|---|---|---|---|---|
| 9,667,790 B1* | 5/2017 | Desai | ................. | G06Q 30/0251 |
| 2005/0135595 A1* | 6/2005 | Bushey | ............... | H04M 3/5191 |
| | | | | 379/265.01 |
| 2020/0128130 A1* | 4/2020 | Geary | ................. | H04M 3/5141 |

\* cited by examiner

*Primary Examiner* — Harry S Hong (57) ABSTRACT

A system is provided that employs a multi-dimensional presence model to manage routing of interaction requests from customers to available agents over available omni-channels in contact center(s). The multi-dimensional presence model employs multiple model states that define availability and capacity for a given agent or class of agents, including, but not limited to, an availability state of the agent, as well as occupancy, activity, device, and channel states to which a routing engine in the contact center can effectively route requested interactions of a customer with an agent. A capacity manager is also disclosed that can be used to facilitate the configuring of the multi-dimensional presence model for a given agent or class of agents.

20 Claims, 7 Drawing Sheets

Availability
302

Current/Future Occupancy
304

Device
308

Activity
306

Channel
310

Agent
312

METHOD OF USING MULTI-DIMENSIONAL PRESENCE MODEL TO MANAGE CALL-CENTER AGENT LOAD

BACKGROUND

Modern contact centers use a variety of technology to attempt to efficiently route customer requests to contact-center agents. With the increased availability of communication channels or means of interacting with the customers, e.g., via telephone, video chat, social media, electronic communication (e-mail), chat messaging, routing can be challenging based on simple available states of the contact center agents.

SUMMARY

A system is provided that employs a multi-dimensional presence model to manage routing of interaction requests from customers to available agents over available omni-channels in contact center(s). The multi-dimensional presence model employs multiple model states that define availability and capacity for a given agent or class of agents, including, but not limited to, an availability state of the agent, as well as occupancy, activity, device, and channel states to which a routing engine in the contact center can effectively route requested interactions of a customer with an agent.

In some embodiments, a capacity manager is disclosed that facilitate the configuring of the multi-dimensional presence model for a given agent or class of agents. For example, sharing a screen via a video conferencing application with a customer to assist the customer in addressing an issue while concurrently talking on the phone with the same customer is considered an omni-channel interaction. Omni-channel operations can be implemented in concert with multi-channel communication, which, as used herein, generally refers to the usage of multiple communication channels for interaction (e.g., over voice, chat, video conference, social media) with a plurality of different customers.

As used herein, the term "omni-channel" refers to the ability or capabilities to interact with a single customer across multiple channels.

As used herein, the term "agent" refers a person that is employed or contracted at the contact center to perform a function or service for a customer, who is also a person. The service or function provided may be related to services for new customers such as telemarketing, information gathering, or claim processing, as well as services for existing customer such as customer service, technical support, fraud prevention, and the like. The term "customer" as used herein also refers to a person.

As used herein, the term "agent mobile device" refers to a mobile device used by an agent in the context of contact center operations and workflow. Mobile device refers to a portable computing device such as a smartphone, mobile phone, portable computer, or tablet computer configured to operate in a broadband wireless network, mobile broadband network, LTE network, GSM network, CDMA network, 5G network, or the like. Mobile broadband generally refers to wireless Internet access through a built-in or external modem. Wireless broadband generally refers to high-speed wireless Internet access or computer networking access over a wide area.

In an aspect, a computer implemented method is disclosed to manage routing load of a call-center agent, the method comprising providing, by a processor of a first computing device, agent capacity configuration defined in a multi-dimensional capacity model for omni-channel interaction with a customer, wherein the multi-dimensional capacity model includes a first model state, a second model state, and a third model state, wherein the first model state is associated with an agent or agent profile, a second model state associated with a contact-center communication type available for an agent-customer interaction, a third model state associated with an associated device for the contact-center communication type, and a fourth model state associated with a degree of occupancy for a given first, second, and third model state; determining, by the processor, an available interaction capacity value for a given agent using the multi-dimensional capacity model; determining, by the processor, a channel type in a request for an interaction with an agent; and routing, by the processor, the request to an agent interaction to a given agent when the determined available interaction capacity value for the given agent at least meets the estimated capacity requirement for the interaction.

In some embodiments, the available interaction capacity value for the given agent is determined by summing all the capacity values of current interactions assigned to the given agent.

In some embodiments, the capacity values of current interactions assigned to the given agent is defined, at least by, a first, second, and third state in the multi-dimensional capacity model for the given agent.

In some embodiments, the capacity values of current interactions assigned to the given agent is defined, at least by, a first, second, third, and fourth state in the multi-dimensional capacity model for the given agent.

In some embodiments, the multi-dimensional capacity model includes a fifth model state, the fifth model state being associated with an activity or task.

In some embodiments, the multi-dimensional capacity model includes a fifth model state, the fifth model state being associated with an activity or task.

In some embodiments, the second model state associated with the contact-center communication type available for the agent-customer interaction includes a first parameter associated with an interaction between the given agent and the customer and a second parameter associated with a wrap-up activity following the interaction between the given agent and the customer.

In some embodiments, the second parameter associated with a wrap-up activity includes an occupancy value associated with data entry of customer notes for the interaction.

In some embodiments, the contact-center communication type available for the agent-customer interaction includes a voice interaction channel, a SMS interaction channel, an email interaction channel, a messaging client interaction channel, and a database interaction channel.

In some embodiments, the database interaction channels is associated with interaction with a customer relation management (CRM) database.

In another aspect, a system is disclosed to manage routing load of a call-center agent, the system comprising a processor; and a memory having instructions stored thereon, wherein execution of the instructions by the processor, cause the processor to retrieve agent capacity configuration defined in a multi-dimensional capacity model for omni-channel interaction with a customer, wherein the multi-dimensional capacity model includes a first model state, a second model state, and a third model state, wherein the first model state is associated with an agent or agent profile, a second model state associated with a contact-center communication type available for an agent-customer interaction, a third model state associated with an associated device for the contact-center communication type, and a fourth model state associated with a degree of occupancy for a given first, second, and third model state; determine an available interaction capacity value for a given agent using the multi-dimensional capacity model; determine a channel type in a request for an interaction with an agent; and route the request to an agent interaction to a given agent when the determined available interaction capacity value for the given agent at least meets the estimated capacity requirement for the interaction.

In some embodiments, the available interaction capacity value for the given agent is determined by summing all the capacity values of current interactions assigned to the given agent.

In some embodiments, the capacity values of current interactions assigned to the given agent is defined, at least by, a first, second, and third state in the multi-dimensional capacity model for the given agent.

In some embodiments, the capacity values of current interactions assigned to the given agent is defined, at least by, a first, second, third, and fourth state in the multi-dimensional capacity model for the given agent.

In some embodiments, the multi-dimensional capacity model includes a fifth model state, the fifth model state being associated with an activity or task.

In some embodiments, the multi-dimensional capacity model includes a fifth model state, the fifth model state being associated with an activity or task.

In some embodiments, the second model state associated with the contact-center communication type available for the agent-customer interaction includes a first parameter associated with an interaction between the given agent and the customer and a second parameter associated with a wrap-up activity following the interaction between the given agent and the customer.

In some embodiments, the system comprises a routing engine in a contact center.

In some embodiments, the contact-center communication type available for the agent-customer interaction includes a voice interaction channel, a SMS interaction channel, an email interaction channel, a messaging client interaction channel, and a database interaction channel.

In another aspect, a non-transitory computer readable medium is disclosed that can be used to manage routing load of a call-center agent, the computer readable medium of instructions stored thereon, wherein execution of the instructions by a processor, cause the processor to retrieve agent capacity configuration defined in a multi-dimensional capacity model for omni-channel interaction with a customer, wherein the multi-dimensional capacity model includes a first model state, a second model state, and a third model state, wherein the first model state is associated with an agent or agent profile, a second model state associated with a contact-center communication type available for an agent-customer interaction, a third model state associated with an associated device for the contact-center communication type, and a fourth model state associated with a degree of occupancy for a given first, second, and third model state; determine an available interaction capacity value for a given agent using the multi-dimensional capacity model; determine a channel type in a request for an interaction with an agent; and route the request to an agent interaction to a given agent when the determined available interaction capacity value for the given agent at least meets the estimated capacity requirement for the interaction.

In another aspect, a computer implemented method is disclosed to create a multi-dimensional presence model for an agent to manage a routing load of a call-center, the method comprising receiving, by a processor of a first computing device, from a graphical user interface hosted at the first computing device, a plurality of inputs from input widgets in the graphical user interface, including a first input, a second input, a third input, and a fourth input, wherein the first input is associated with an contact-center communication type available for an agent-customer interaction, wherein the second input is associated with a maximum number of interactions, wherein the third input is associated with an interaction weight parameter for each of the available contact-center communication type, and wherein the fourth input is associated with an availability state of the agent; and transmitting, by the processor, to a database accessible by a routing engine, data associated with the first, second, third, and fourth input, wherein the transmitted data is subsequently used to route a request for an interaction between a customer and an agent using a determined available interaction capacity value determined for the agent based on the data associated with the first, second, third, and fourth input.

In some embodiments, the available interaction capacity value for the given agent is determined by summing all the capacity values of current interactions assigned to the given agent.

In some embodiments, the capacity values of current interactions assigned to the given agent is defined, at least by, a first, second, and third state in the multi-dimensional capacity model for the given agent.

In some embodiments, the capacity values of current interactions assigned to the given agent is defined, at least by, a first, second, third, and fourth state in the multi-dimensional capacity model for the given agent.

In some embodiments, the multi-dimensional capacity model includes a fifth model state, the fifth model state being associated with an activity or task.

In some embodiments, the multi-dimensional capacity model includes a fifth model state, the fifth model state being associated with an activity or task.

In some embodiments, the second model state associated with the contact-center communication type available for the agent-customer interaction includes a first parameter associated with an interaction between the given agent and the customer and a second parameter associated with a wrap-up activity following the interaction between the given agent and the customer.

In some embodiments, the second parameter associated with a wrap-up activity includes an occupancy value associated with data entry of customer notes for the interaction.

In some embodiments, the contact-center communication type available for the agent-customer interaction includes a voice interaction channel, a SMS interaction channel, an email interaction channel, a messaging client interaction channel, and a database interaction channel.

In some embodiments, the database interaction channels is associated with interaction with a customer relation management (CRM) database.

In another aspect, a system is disclosed to manage routing load of a call-center agent, the system comprising a processor; and a memory having instructions stored thereon, wherein execution of the instructions by the processor, cause the processor to generate a graphical user interface; receive, from the graphical user interface, a plurality of inputs from input widgets in the graphical user interface, including a first input, a second input, a third input, and a fourth input, wherein the first input is associated with an contact-center communication type available for an agent-customer interaction, wherein the second input is associated with a maximum number of interactions, wherein the third input is associated with an interaction weight parameter for each of the available contact-center communication type, and wherein the fourth input is associated with an availability state of the agent; and transmit, to a database accessible by a routing engine, data associated with the first, second, third, and fourth input, wherein the transmitted data is subsequently used to route a request for an interaction between a customer and an agent using a determined available interaction capacity value determined for the agent based on the data associated with the first, second, third, and fourth input.

In some embodiments, the available interaction capacity value for the given agent is determined by summing all the capacity values of current interactions assigned to the given agent.

In some embodiments, the capacity values of current interactions assigned to the given agent is defined, at least by, a first, second, and third state in the multi-dimensional capacity model for the given agent.

In some embodiments, the capacity values of current interactions assigned to the given agent is defined, at least by, a first, second, third, and fourth state in the multi-dimensional capacity model for the given agent.

In some embodiments, the multi-dimensional capacity model includes a fifth model state, the fifth model state being associated with an activity or task.

In some embodiments, the multi-dimensional capacity model includes a fifth model state, the fifth model state being associated with an activity or task.

In some embodiments, the second model state associated with the contact-center communication type available for the agent-customer interaction includes a first parameter associated with an interaction between the given agent and the customer and a second parameter associated with a wrap-up activity following the interaction between the given agent and the customer.

In some embodiments, the system comprises a computing device that provides inputs to a capacity manager module in a contact center.

In some embodiments, the contact-center communication type available for the agent-customer interaction includes a voice interaction channel, a SMS interaction channel, an email interaction channel, a messaging client interaction channel, and a database interaction channel.

In some embodiments, the database interaction channels is associated with interaction with a customer relation management (CRM) database.

In another aspect, a non-transitory computer readable medium is disclosed to manage routing load of a call-center agent, the computer readable medium comprising instructions stored thereon, wherein execution of the instructions by a processor, cause the processor to generate a graphical user interface; receive, from the graphical user interface, a plurality of inputs from input widgets in the graphical user interface, including a first input, a second input, a third input, and a fourth input, wherein the first input is associated with an contact-center communication type available for an agent-customer interaction, wherein the second input is associated with a maximum number of interactions, wherein the third input is associated with an interaction weight parameter for each of the available contact-center communication type, and wherein the fourth input is associated with an availability state of the agent; and transmit, to a database accessible by a routing engine, data associated with the first, second, third, and fourth input, wherein the transmitted data is subsequently used to route a request for an interaction between a customer and an agent using a determined available interaction capacity value determined for the agent based on the data associated with the first, second, third, and fourth input.

In another aspect, a computer implemented method is disclosed to create a multi-dimensional presence model for an agent to manage a routing load of a call-center, the method comprising receiving, by a processor of a first computing device, from a graphical user interface hosted on a second computing device, a plurality of inputs from input widgets in the graphical user interface, including a first input, a second input, a third input, and a fourth input, wherein the first input is associated with an contact-center communication type available for an agent-customer interaction, wherein the second input is associated with a maximum number of interactions, wherein the third input is associated with an interaction weight parameter for each of the available contact-center communication type, and wherein the fourth input is associated with an availability state of the agent; and storing, by the processor, in a database accessible by a routing engine, data associated with the first, second, third, and fourth input, wherein the stored data is subsequently used to route a request for an interaction between a customer and an agent using a determined available interaction capacity value determined for the agent based on the data associated with the first, second, third, and fourth input.

In some embodiments, the available interaction capacity value for the given agent is determined by summing all the capacity values of current interactions assigned to the given agent.

In some embodiments, the capacity values of current interactions assigned to the given agent is defined, at least by, a first, second, and third state in the multi-dimensional capacity model for the given agent.

In some embodiments, the capacity values of current interactions assigned to the given agent is defined, at least by, a first, second, third, and fourth state in the multi-dimensional capacity model for the given agent.

In some embodiments, the multi-dimensional capacity model includes a fifth model state, the fifth model state being associated with an activity or task.

In some embodiments, the multi-dimensional capacity model includes a fifth model state, the fifth model state being associated with an activity or task.

In some embodiments, the second model state associated with the contact-center communication type available for the agent-customer interaction includes a first parameter associated with an interaction between the given agent and the customer and a second parameter associated with a wrap-up activity following the interaction between the given agent and the customer.

In some embodiments, the second parameter associated with a wrap-up activity includes an occupancy value associated with data entry of customer notes for the interaction.

In some embodiments, the contact-center communication type available for the agent-customer interaction includes a voice interaction channel, a SMS interaction channel, an email interaction channel, a messaging client interaction channel, and a database interaction channel.

In some embodiments, the database interaction channels is associated with interaction with a customer relation management (CRM) database.

In another aspect, a system is disclosed to manage routing load of a call-center agent, the system comprising a processor; and a memory having instructions stored thereon, wherein execution of the instructions by the processor, cause the processor to receive, from a graphical user interface hosted on a computing device, a plurality of inputs from input widgets in the graphical user interface, including a first input, a second input, a third input, and a fourth input, wherein the first input is associated with an contact-center communication type available for an agent-customer interaction, wherein the second input is associated with a maximum number of interactions, wherein the third input is associated with an interaction weight parameter for each of the available contact-center communication type, and wherein the fourth input is associated with an availability state of the agent; and store, in a database accessible by a routing engine, data associated with the first, second, third, and fourth input, wherein the stored data is subsequently used to route a request for an interaction between a customer and an agent using a determined available interaction capacity value determined for the agent based on the data associated with the first, second, third, and fourth input.

In some embodiments, the available interaction capacity value for the given agent is determined by summing all the capacity values of current interactions assigned to the given agent.

In some embodiments, the capacity values of current interactions assigned to the given agent is defined, at least by, a first, second, and third state in the multi-dimensional capacity model for the given agent.

In some embodiments, the capacity values of current interactions assigned to the given agent is defined, at least by, a first, second, third, and fourth state in the multi-dimensional capacity model for the given agent.

In some embodiments, the multi-dimensional capacity model includes a fifth model state, the fifth model state being associated with an activity or task.

In some embodiments, the multi-dimensional capacity model includes a fifth model state, the fifth model state being associated with an activity or task.

In some embodiments, the second model state associated with the contact-center communication type available for the agent-customer interaction includes a first parameter associated with an interaction between the given agent and the customer and a second parameter associated with a wrap-up activity following the interaction between the given agent and the customer.

In some embodiments, the system comprises a capacity manager module in a contact center.

In some embodiments, the contact-center communication type available for the agent-customer interaction includes a voice interaction channel, a SMS interaction channel, an email interaction channel, a messaging client interaction channel, and a database interaction channel.

In some embodiments, the database interaction channels is associated with interaction with a customer relation management (CRM) database.

In another aspect, a non-transitory computer readable medium is disclosed to manage routing load of a call-center agent, the computer readable medium comprising instructions stored thereon, wherein execution of the instructions by a processor, cause the processor to receive, from a graphical user interface hosted on a computing device, a plurality of inputs from input widgets in the graphical user interface, including a first input, a second input, a third input, and a fourth input, wherein the first input is associated with an contact-center communication type available for an agent-customer interaction, wherein the second input is associated with a maximum number of interactions, wherein the third input is associated with an interaction weight parameter for each of the available contact-center communication type, and wherein the fourth input is associated with an availability state of the agent; and store, in a database accessible by a routing engine, data associated with the first, second, third, and fourth input, wherein the stored data is subsequently used to route a request for an interaction between a customer and an agent using a determined available interaction capacity value determined for the agent based on the data associated with the first, second, third, and fourth input.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Disclosed herein are systems and methods that employ a multi-dimensional presence model to manage routing of interaction requests from customers to available agents over available omni-channels in contact centers. The multi-dimensional presence model employs multiple model states that define availability and capacity for a given agent or class of agents, including, but not limited to, an availability state of the agent, as well as occupancy, activity, device, and channel states to which a routing engine in the contact center can effectively route requested interactions of a customer with an agent.

Figure 1:
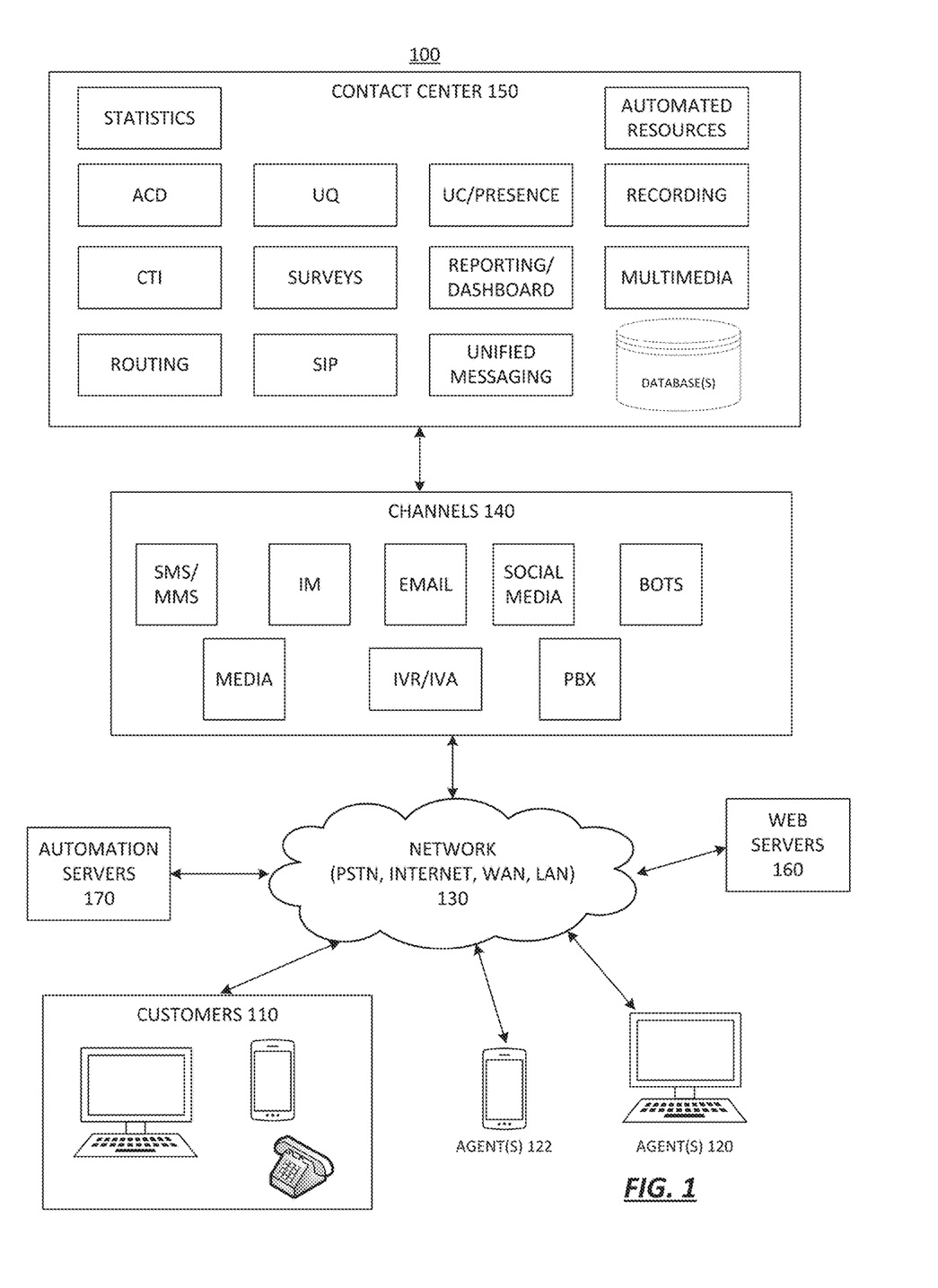
FIG. 1 illustrates an example environment.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 100 and one or more channels 140. The agent(s) 120 may be remote from the contact center 150 and handle communications with customers 110 on behalf of an enterprise or other entity. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

The contact center 150 may be cloud-based and distributed over a plurality of locations. The contact center 150 may include servers, databases, and other components. In particular, the contact center 150 may include, but is not limited to, a routing server, a SIP server, an outbound server, automated call distribution (ACD), a computer telephony integration server (CTI), an email server, an IM server, a social server, a SMS server, and one or more databases for routing, historical information and campaigns.

The routing server may serve as an adapter or interface between the switch and the remainder of the routing, monitoring, and other communication-handling components of the contact center. The routing server may be configured to process PSTN calls, VoIP calls, and the like. For example, the routing server may be configured with the CTI server software for interfacing with the switch/media gateway and contact center equipment. In other examples, the routing server may include the SIP server for processing SIP calls. The routing server may extract data about the customer interaction such as the caller's telephone number (often known as the automatic number identification (ANI) number), or the customer's internet protocol (IP) address, or email address, and communicate with other contact center components in processing the interaction.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered.

For inbound SIP messages, the routing server may use statistical data from the statistics server and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

Customers 110 may initiate inbound communications (e.g., telephony calls, emails, chats, video chats, social media posts, etc.) to the contact center 150 via an end user device. End user devices may be a communication device, such as, a telephone, wireless phone, smart phone, personal computer, electronic tablet, etc., to name some non-limiting examples. Customers 110 operating the end user devices may initiate, manage, and respond to telephone calls, emails, chats, text messaging, web-browsing sessions, and other multi-media transactions. Agent(s) 120 and customers 110 may communicate with each other and with other services over the network 100. For example, a customer calling on telephone handset may connect through the PSTN and terminate on a private branch exchange (PBX). A video call originating from a tablet may connect through the network 100 terminate on the media server. The channels 140 are coupled to the communications network 100 for receiving and transmitting telephony calls between customers 110 and the contact center 150. A media gateway may include a telephony switch or communication switch for routing within the contact center. The switch may be a hardware switching system or a soft switch implemented via software. For example, the media gateway may communicate with an automatic call distributor (ACD), a private branch exchange (PBX), an IP-based software switch and/or other switch to receive Internet-based interactions and/or telephone network-based interactions from a customer 110 and route those interactions to an agent 120. More detail of these interactions is provided below.

As another example, a customer smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers 110 to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. IVA systems may cover a variety of media channels in addition to voice, including, but not limited to social media, email, SMS/MMS, IM, etc. and they may communicate with their counterpart's application (not shown) within the contact center 150. The IVA system may be configured with a script for querying customers on their needs. The IVA system may ask an open-ended questions such as, for example, "How can I help you?" and the customer 110 may speak or otherwise enter a reason for contacting the contact center 150. The customer's response may then be used by a routing server to route the call or communication to an appropriate contact center resource.

In response, the routing server may find an appropriate agent 120 or automated resource to which an inbound customer communication is to be routed, for example, based on a routing strategy employed by the routing server, and further based on information about agent availability, skills, and other routing parameters provided, for example, by the statistics server. The routing server may query one or more databases, such as a customer database, which stores information about existing clients, such as contact information, service level agreement requirements, nature of previous customer contacts and actions taken by contact center to resolve any customer issues, etc. The routing server may query the customer information from the customer database via an ANI or any other information collected by the IVA system.

Once an appropriate agent and/or automated resource is identified as being available to handle a communication, a connection may be made between the customer 110 and an agent device of the identified agent 120 and/or the automate resource. Collected information about the customer and/or the customer's historical information may also be provided to the agent device for aiding the agent in better servicing the communication. In this regard, each agent device may include a telephone adapted for regular telephone calls, VoIP calls, etc. The agent device may also include a computer for communicating with one or more servers of the contact center and performing data processing associated with contact center operations, and for interfacing with customers via voice and other multimedia communication mechanisms.

The contact center 150 may also include a multimedia/social media server for engaging in media interactions other than voice interactions with the end user devices and/or other web servers 160. The media interactions may be related, for example, to email, vmail (voice mail through email), chat, video, text-messaging, web, social media, co-browsing, etc. In this regard, the multimedia/social media server may take the form of any IP router conventional in the art with specialized hardware and software for receiving, processing, and forwarding multi-media events.

The web servers 160 may include, for example, social media sites, such as, Facebook, Twitter, Instagram, etc. In this regard, the web servers 160 may be provided by third parties and/or maintained outside of the contact center 160 that communicate with the contact center 150 over the network 100. The web servers 160 may also provide web pages for the enterprise that is being supported by the contact center 150. End users may browse the web pages and get information about the enterprise's products and services. The web pages may also provide a mechanism for contacting the contact center, via, for example, web chat, voice call, email, WebRTC, etc.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and playback audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center.

Figure 2:
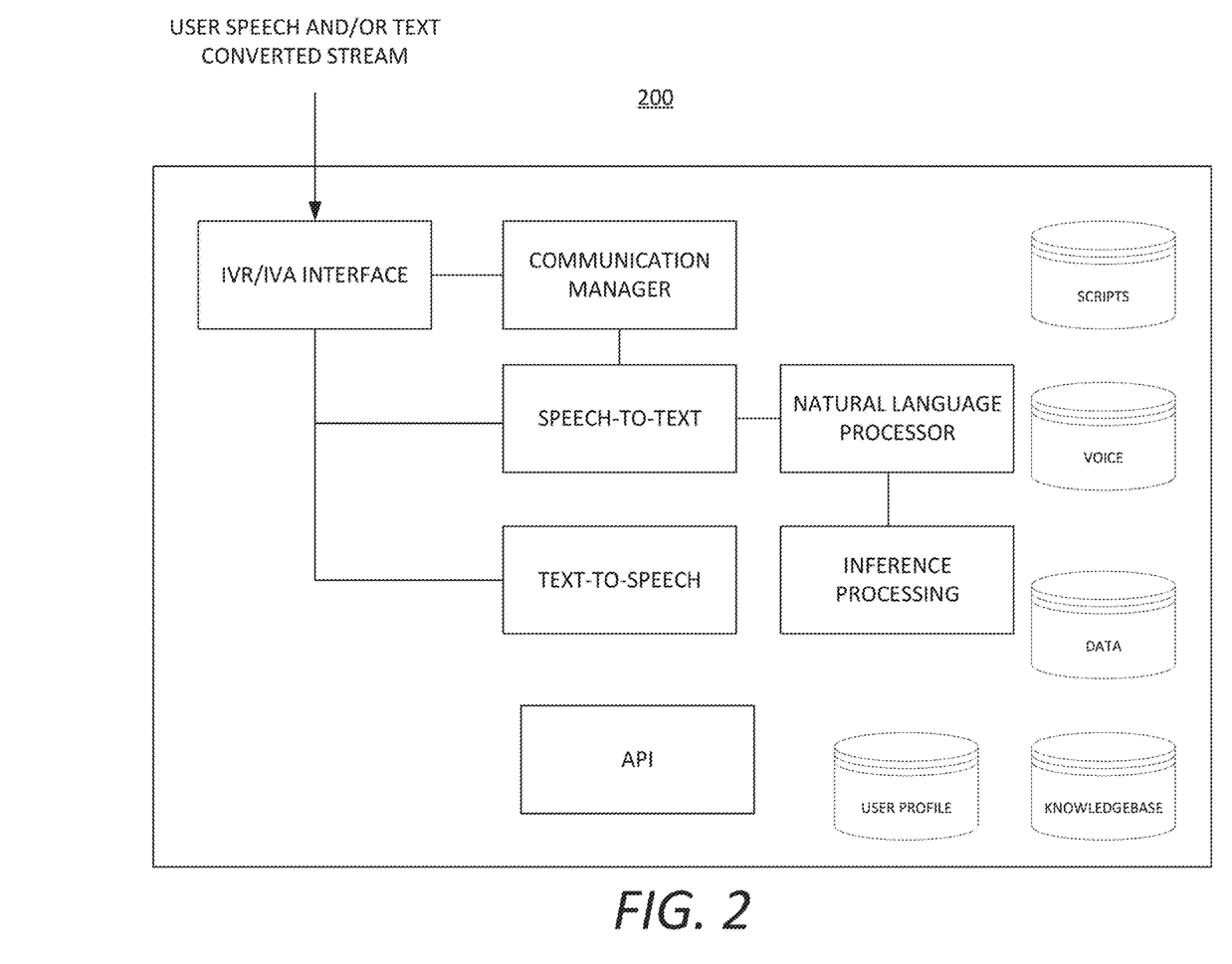
FIG. 2 illustrates example component that provide automation, routing and/or omnichannel functionalities within the context of the environment of FIG. 1.

With respect to the cloud-based contact center, FIG. 2 illustrates an example automation infrastructure 200 implemented within the cloud-based contact center 150. The automation infrastructure 200 may automatically collect information from a customer 110 user through, e.g., a user interface/voice interface 202, where the collection of information may not require the involvement of a live agent. The user input may be provided as free speech or text (e.g., unstructured, natural language input). This information may be used by the automation infrastructure 200 for routing the customer 110 to an agent 120, to automated resources in the contact center 150, as well as gathering information from other sources to be provided to the agent 120. In operation, the automation infrastructure 200 may parse the natural language user input using a natural language processing module 210 to infer the customer's intent using an intent inference module 212 in order to classify the intent. Where the user input is provided as speech, the speech is transcribed into text by a speech-to-text system 206 (e.g., a large vocabulary continuous speech recognition or LVCSR system) as part of the parsing by the natural language processing module 210. The communication manager 204 monitors user inputs and presents notifications within the user interface/voice interface 202. Responses by the automation infrastructure 200 to the customer 110 may be provided as speech using the text-to-speech system 208.

The intent inference module automatically infers the customer's 110 intent from the text of the user input using artificial intelligence or machine learning techniques. These artificial intelligence techniques may include, for example, identifying one or more keywords from the user input and searching a database of potential intents (e.g., call reasons) corresponding to the given keywords. The database of potential intents and the keywords corresponding to the intents may be automatically mined from a collection of historical interaction recordings, in which a customer may provide a statement of the issue, and in which the intent is explicitly encoded by an agent.

Some aspects of the present disclosure relate to automatically navigating an IVR system of a contact center on behalf of a user using, for example, the loaded script. In some implementations of the present disclosure, the script includes a set of fields (or parameters) of data that are expected to be required by the contact center in order to resolve the issue specified by the customer's 110 intent. In some implementations of the present disclosure, some of the fields of data are automatically loaded from a stored user profile. These stored fields may include, for example, the customer's 110 full name, address, customer account numbers, authentication information (e.g., answers to security questions) and the like.

Some aspects of the present disclosure relate to the automatic authentication of the customer 110 with the provider. For example, in some implementations of the present disclosure, the user profile may include authentication information that would typically be requested of users accessing customer support systems such as usernames, account identifying information, personal identification information (e.g., a social security number), and/or answers to security questions. As additional examples, the automation infrastructure 200 may have access to text messages and/or email messages sent to the customer's 110 account on the end user device in order to access one-time passwords sent to the customer 110, and/or may have access to a one-time password (OTP) generator stored locally on the end user device. Accordingly, implementations of the present disclosure may be capable of automatically authenticating the customer 110 with the contact center prior to an interaction.

In some implementations of the present disclosure an application programming interface (API) is used to interact with the provider directly. The provider may define a protocol for making commonplace requests to their systems. This API may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, a customer experience automation system 200 according to one implementation of the present disclosure automatically generates a formatted message in accordance with an API define by the provider, where the message contains the information specified by the script in appropriate portions of the formatted message.

Some aspects of the present disclosure relate to systems and methods for automating and augmenting aspects of an interaction between the customer 110 and a live agent of the contact center. In an implementation, once an interaction, such as through a phone call, has been initiated with the agent 120, metadata regarding the conversation is displayed to the customer 110 and/or agent 120 in the UI throughout the interaction. Information, such as call metadata, may be presented to the customer 110 through the UI 205 on the customer's 110 mobile device 105. Examples of such information might include, but not be limited to, the provider, department call reason, agent name, and a photo of the agent.

According to some aspects of implementations of the present disclosure, both the customer 110 and the agent 120 can share relevant content with each other through the application (e.g., the application running on the end user device). The agent may share their screen with the customer 110 or push relevant material to the customer 110.

In yet another implementation, the automation infrastructure 200 may also "listen" in on the conversation and automatically push relevant content from a knowledge base to the customer 110 and/or agent 120. For example, the application may use a real-time transcription of the customer's input (e.g., speech) to query a knowledgebase to provide a solution to the agent 120. The agent may share a document describing the solution with the customer 110. The application may include several layers of intelligence where it gathers customer intelligence to learn everything it can about why the customer 110 is calling. Next, it may perform conversation intelligence, which is extracting more context about the customer's intent. Next, it may perform interaction intelligence to pull information from other sources about customer 100. The automation infrastructure 200 may also perform contact center intelligence to implement workflow management (WFM)/workflow management automation (WFA) features of the contact center 150.

Multi-Dimensional Presence Model for Omni-Channel Interaction

Figure 3:
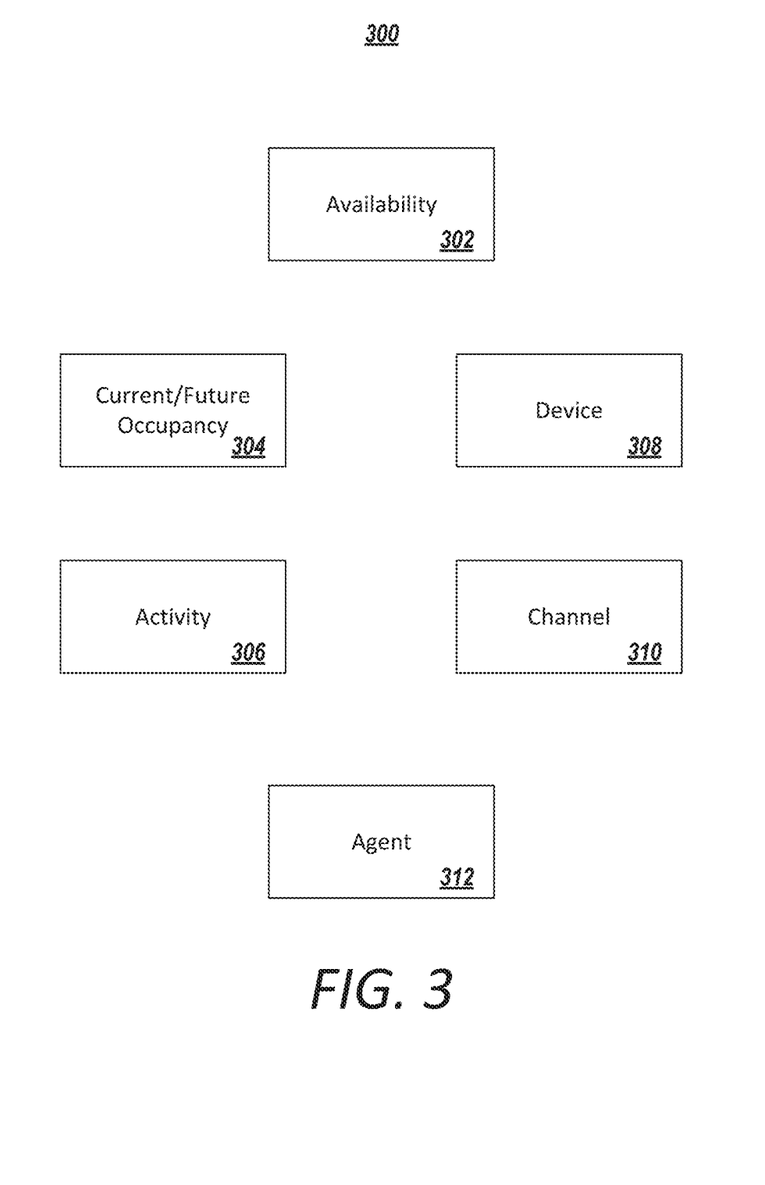
FIG. 3 shows an example multi-dimensional presence model for omni-channel interactions.

FIG. 3 shows an example multi-dimensional presence model 300 for omni-channel interaction(s). The model 300 includes multiple model states that define availability and capacity for a given agent or class of agents, including, but not limited to, an availability state 302 of the agent, as well as occupancy state 304, activity state 306, device state 308, and channel state 310.

A routing engine may use all, or a several of these states, when making routing decisions from a requested interaction from the customer to a given agent. The multi-dimensional presence model 300 provides a systematic and holistic approach to assess capabilities, availabilities, and occupancy of an agent. For example, can this agent or agent class handle 3 chats, 2 emails, and a phone call simultaneously? Can this agent or agent class handle such cognitive load while working at a specialized agent terminal? Or via a remote terminal (e.g., smart phone or tablet). The model may account for the experience of the agent (e.g. senior agent versus new agent) and past historical performance of the agent (e.g., how much can this agent handle historically).

Availability state 302 generally refers the state of the agent in being able to perform or service a new interaction or activity. The agent may set their availability status to "available", "partially available", "not available", "busy", "not on-line". In some embodiments, the system may automatically set the availability status of the agent when the agent logs in or clocks in to a system. Each of these availability status may have an associated capacity value that may be defined by the contact center administrator or by the agent. For example, when in the "available" state, the capacity value may be 100 (out of 100), while a "partially available" state may have a default value of 50. In some embodiments, availability status 302 includes "custom work" status that is defined for a given activity or may be defined by the agent, the agent's supervisor, or the contact center administrator. Availability status 302, and its associated parameters, may be adjusted by the system based on calendar day, time of day, among others.

Occupancy state 304 generally refers to an estimated or measured current occupied state of the agent. The estimated state may be determined based on routed interactions send to the agent. Measured occupancy may be based on monitored sensor information associated with the agent or usage information associated with a given communication channel or medium. The occupancy state 304 may be expressed in percentile (e.g., between 0 and 100%) or numerically (e.g., having a range of 0 and 1 or any range of units, e.g., 0 to 144). In some embodiments, occupancy state 304 may include future estimated occupancy. For example, the system may estimate available occupancy state based on agent's calendar, schedule, expected breaks, etc.

Activity state 306 provides a state to capture occupancy of background tasks. Activity may include customer interacting activity, or it can be ancillary activity that must be performed by a given agent or agent supervisor. For example, a supervisor may be tasked with silently monitoring on-going interactions between an agent and a customer. The supervisor may thus have a monitoring activity. Indeed, the supervisor may not have to be actively participating in the call but has to be sufficiently engaged to be aware that the agent is properly executing on his or her duties and/or complying with established policies and guidelines.

Device state 308 provides a weight or cost associated with the infrastructure or device to which an agent and customer interaction is conducted. Device generally refers to a given device type, model, or class that is being used in the interaction and can include tablet, remote terminal, computing terminal, smart phone, desk phone. Devices have different user interfaces and supporting services and operations, which may affect or penalize a given interaction.

Channel state 310 provides a state to capture weight or cost associated with a given communication or interaction medium or type for the purpose of carrying out an interaction with a customer as well as other service or functions that the agent has to be performed in conjunction with or parallel to the servicing of such interactions. Examples of such interaction associated channel can include a communication type and/or associated user interface and can include, voice channels, video conferencing, chat messaging, social media platform, emails. Examples of non-communication-based interactions include activity, functions, or tasks that the agent may be asked to perform in concert with, before, or after a given interaction with a given customer.

Weights and associated cost (or penalty scoring or ranking) for various channel types states may be statistically assessed based on measured efficiency and time to conduct similar operation across different channels. A voice interaction may require full attention of an agent and thus may have a weight of 1, for example, while a message chat may have an associated weight of 0.2. In some embodiments, the weight or cost may be scaled with respect of one of the channel types, as a baseline channel type, and other weight or cost may be assigned relative that baseline channel type.

Agent 312 provide a state to adjust one or any of the above model states. Agent state may be designated on an individual agent basis (i.e., these are specific metrics, cost, and weights associated with "John Smith"). Agent may also be designated based on the agent's profile, which may be defined by seniority, title, class, training, experience and skill level. Different weights and costs can thus be assigned to senior agents versus newly hired agents; agents having performed or undergone special training, agents having manager's title versus an associate title, and etc.

Indeed, with omni-channel interactions, the use of simple state model having 1-2 states (e.g., agent and availability state) is inefficient and difficult to manage routing effectively. The instant multi-dimensional presence model 300 for omni-channel interaction can provide more granular, systematic, and holistic approach to estimating or determining available capacity for an agent for the purpose of directing workflow and workload to the agent.

Omni-channel operations can be implemented in concert with multi-channel communication, which, as used herein, generally refers to the usage of multiple communication channels for interaction (e.g., over voice, chat, video conference, social media) with a plurality of different customers. Indeed, multi-channel communication refers to multiple customers for one agent, while omni-channel operations refer to a single customer with one agent over multiple different interaction types. Omni-channel operations can be implemented in concert with multi-channel communication, which, as used herein, generally refers to the usage of multiple communication channels for interaction (e.g., over voice, chat, video conference, social media) with a plurality of different customers.

Figure 4:
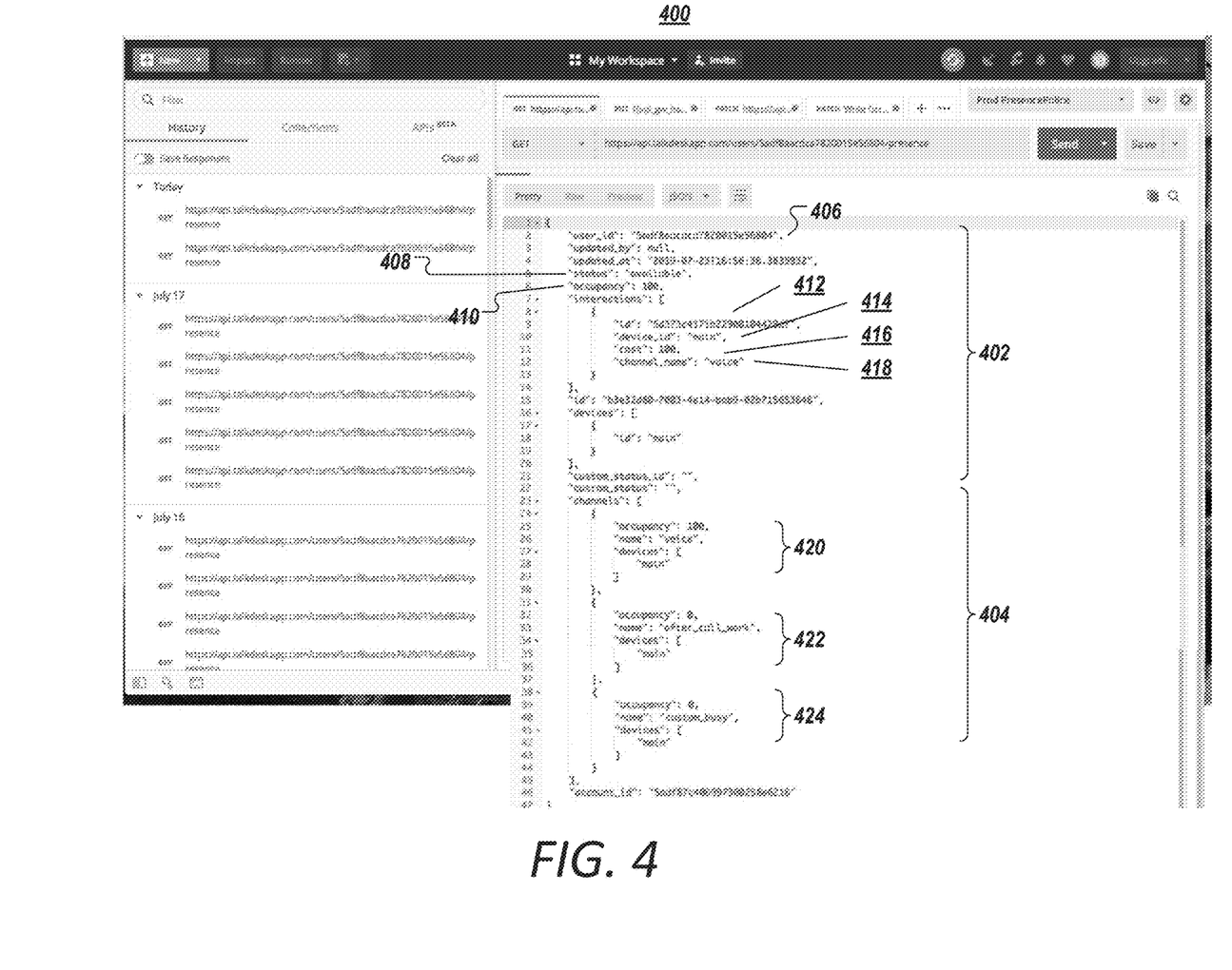
FIG. 4 shows an example JSON representation of a given instance of an interaction of a voice exchange between a user and another user in the context of multi-dimensional presence model for omni-channel interaction.

FIG. 4 shows an example JSON representation of a given instance of an interaction of a voice exchange between a user and another user in the context of multi-dimensional presence model 300 for omni-channel interaction. In FIG. 4, specific details of the interaction is shown in a first portion 402 and associated parameters of a multi-dimensional presence model used to define that exchange is shown in a second portion 404.

In portion 402, the exchange is defined for a given agent 406 (shown as a numerical identifier associated with the agent). The agent has a state of being available (shown as "available" 408) and the exchange having an occupancy value of "100" 410. A given interaction is shown to be defined by the exchange identifier 412 as well as by a device identifier 414, occupancy cost 416, and channel type identifier 418. To this end, a given exchange includes data associated with the device state 308, the occupancy state 304, and the channel state 310, as discussed in relation to FIG. 3.

In this example, the multi-dimensional presence model 300 includes more than one instance of a channel state 304, having a channel state for "voice "channel 420, an "after_call_work" channel 422, and a "custom busy" channel 424. As noted above, a channel can be associated with a communication channel (for the purpose of carrying out an interaction with a customer) or a non-communication channel (e.g., activity) that an agent has to perform or service. In each of the available channel state, an interaction associated with that channel is defined by an occupancy value, a channel name, and an associated device.

Capacity Manager

A capacity manager 500 is disclosed that facilitates the configuring of the multi-dimensional presence model for a given agent or class of agents. The capacity manager 500 may be implemented in any number of computing devices of the system, including, for example, the automation 170, as described in relation to FIG. 1.

In some embodiments, the capacity manager is configured to provide an interface to receive any number of parameters for the multi-dimensional presence model for a given agent or class of agents, including, for example, but not limited to: a default capacity value per account, a relative "cost" of work in a channel.

The capacity manager 500 may be used to list in order of preference for the channels. The preference may be used for tie breaker after applying eligible attributes and interaction priority.

In some embodiments, the capacity manager 500 is configured to provide read-only information on the enabled channels for the account (e.g., coming from the channels configuration).

In some embodiments, the capacity manager 500 is configured to manage custom reasons for away at the account level including how "blocked" the agent is when implementing the reason (e.g., fully blocked; partially blocked meaning inbound transfer can be received).

In some embodiments, the capacity manager 500 is configured to provide an interface to create a user-level rule that can be applied to multiple users at once (e.g., a class of agents or an agent profile, rather than having to set the individual values per agent).

In some embodiments, the capacity manager 500 is configured to assign user rules (e.g., whether a given channel (e.g., voice, chat messaging, etc.) can be used for inbound only, proactive outbound only, or blended).

In some embodiments, the capacity manager 500 is configured to provide and display a user-level max capacity for a given agent. That is, statistics for a given agent, agent department, contact center department or function maybe presented. In some embodiments, the capacity manager 500 may determine and display a view only calculation of the number of interactions possible based on the configured weights. In some embodiments, the capacity manager 500 is configured to create a rule-level of away and unavailable reasons.

Figure 5:
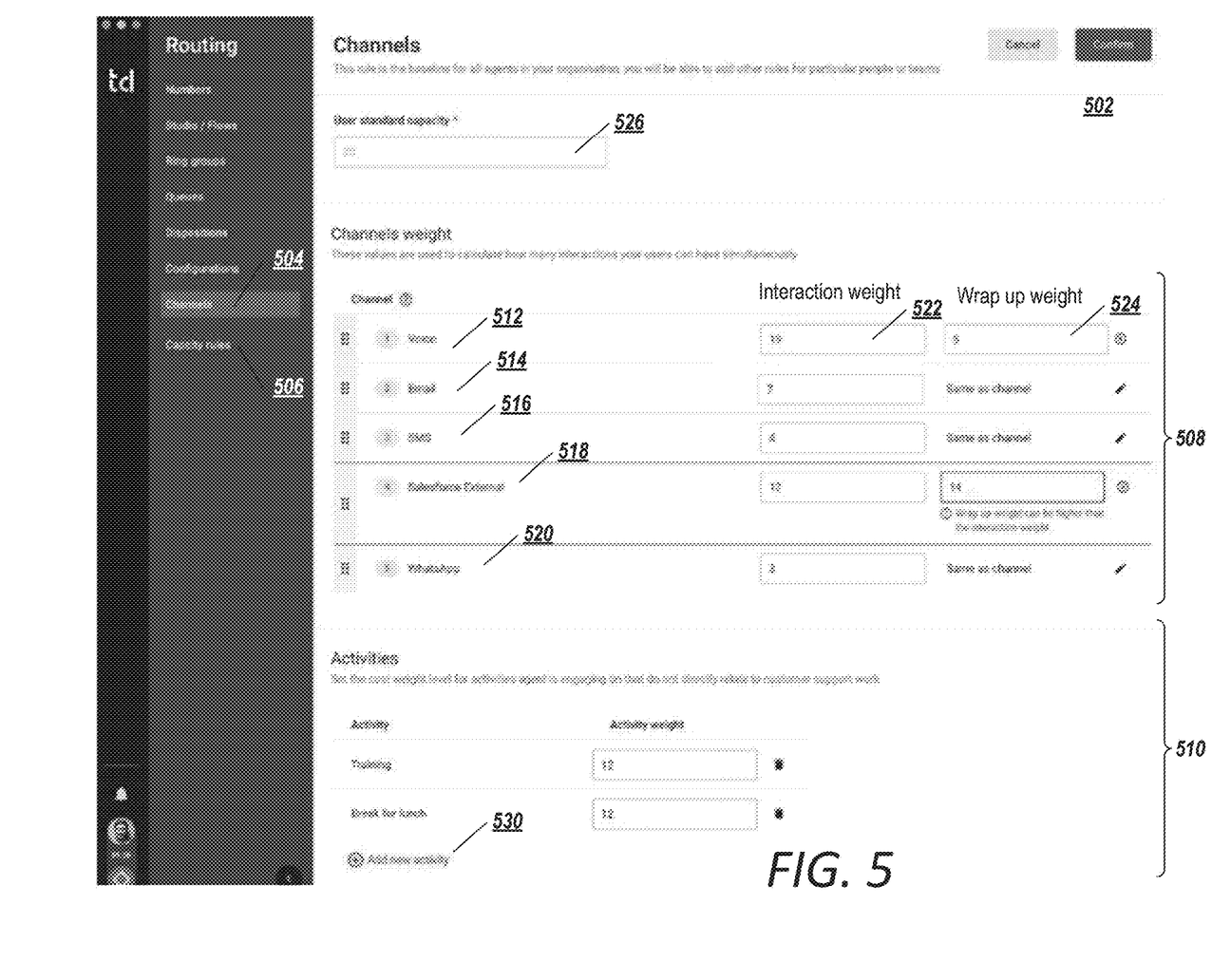
FIGS. 5 and 6 illustrate a graphical user interface for a capacity manager. The capacity manager may be part of routing configurations for a given workflow management at a contact center.
Figure 6:
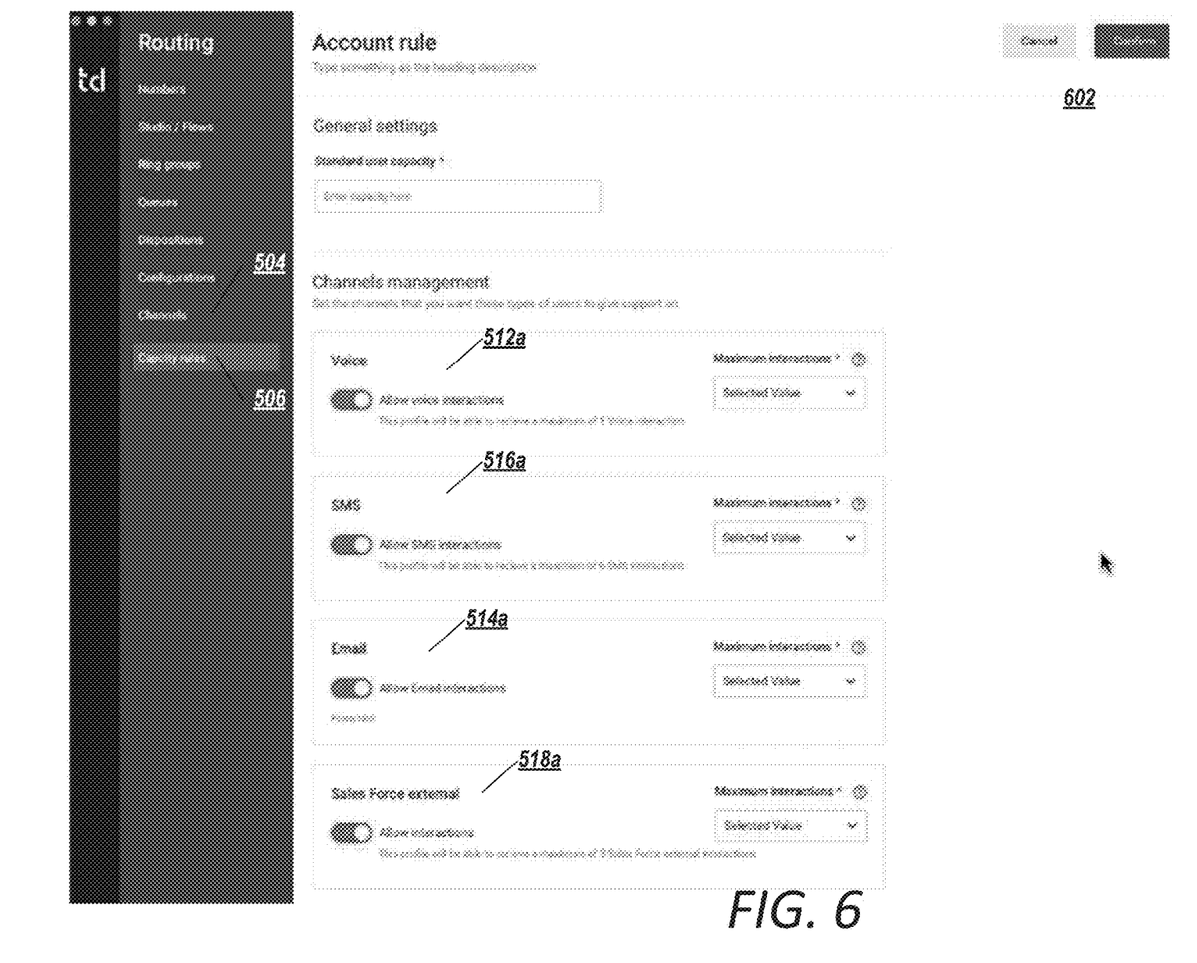

FIGS. 5 and 6 illustrate a graphical user interface 502 for a capacity manager. The capacity manager may be part of routing configurations for a given WFO/WFM at a contact center. Specifically, FIG. 5 provides an interface to assign weights for a given channel. FIG. 6 provides for an interface for the selection of the channels that can be configured in FIG. 5. That is, in interface 502, the capacity manager is illustrated to provide inputs for channels (shown as tab 504) and for capacity rules (shown as tab 506) in which the channel interface (associated with 504) is configured to receive inputs for selected channels and the capacity rules (associated with 506) provides inputs to select the channels that can be configured in the channel interface.

In FIG. 5, in the channel configuration screen 502 (corresponding to tab 504), the capacity manager is configured with two input types, including a first set of inputs for work items (shown as 508) and a set of inputs for custom work rules (shown as 510). A shown in FIG. 5, the interface 502 for the channel configuration 508 includes a first channel associated with voice/video interaction (shown as "Voice" 512), a second channel associated with electronic communication interaction (shown as "Email" 514), a third channel associated with short-message-service/text-messaging-service interaction (shown as "SMS" 516), a fourth channel associated with a CRM interaction (shown as "Salesforce External" 518), and a fifth channel associated with a social media channel (shown as "WhatsApp" 520).

For each of the channels, the interface 502 provides an input for an interaction weight or cost (shown as 522) and second weight or cost to wrap up the interaction following its conclusion (shown as 524).

In FIG. 5, the interface 502 includes an input 526 to assign the maximum capacity for the agent. In some embodiments, the input 526 may be pre-populated with a candidate capacity value that had been determined based on the agent's profile, historical performance, average performance to comparable agents in the same, or similar, function or department. The candidate capacity value are shown in field (not shown) located near to the input 526. In some embodiments, the candidate capacity value may be shown with the factors used to provide the candidate capacity value.

In FIG. 5, the interface 502 also provides a set of inputs for custom work rules (shown as 510). In the example shown in FIG. 5, the custom work rules includes a channel for activities (shown as "Training" 526 and "Break for Lunch" 528). The interface 502 provides inputs 530 to add additional activity types. In some embodiments, the interface 502 may evaluated the input to ensure it meets certain rules. For example, in the example in FIG. 5, the interface 502 generated a notification indicating that a wrap-up weight for a given channel is a higher than the interaction itself. Other rules may be enforced by the system. For CRM, the after-call wrap-up may be higher since it may take longer to update the database with information received from the customer during the call.

In FIG. 6, the interface 502 includes a number of inputs to facilitate selection of channels available to an agent or agent profile, including a channel for voice interaction (shown as 512*a*) a channel or SMS interaction (shown as 516*a*), a channel for email interaction (shown as 514*a*), a channel for CRM interaction (shown as 518*a*), etc. In FIG. 6, the interface 502 also includes inputs to specify the maximum number of interactions for a given channel. In some embodiments, the interface 502 may generate a notification when the number of specified interactions exceeds the number of allowable interactions base don the weight provided in FIG. 5.

The interface 502 facilitate the configuration of agent load that attempts to not overload the cognitive load capability and/or capacity of an agent.

As illustrated by the foregoing discussion, the present disclosure utilizes a variety of terms to describe features and benefits of the contact activity relation system. Additional detail is hereafter provided regarding the meaning of these terms as used in this disclosure. In particular, the term "contacting user" refers to a user that contacts the communication management system. A contacting user can refer to a user that is experiencing a problem or issue with a service system and that contacts the communication management system in an attempt to resolve the problem or to inform others of the problem. For example, a contacting user can include a caller, a chat user, or a text message user that sends an electronic communication to the communication management system. The term "communication" refers to a communication such as a phone call, chat message, text message, instant message, or video call that the communication management system can receive from a contacting user.

Example Computer System

Figure 7:
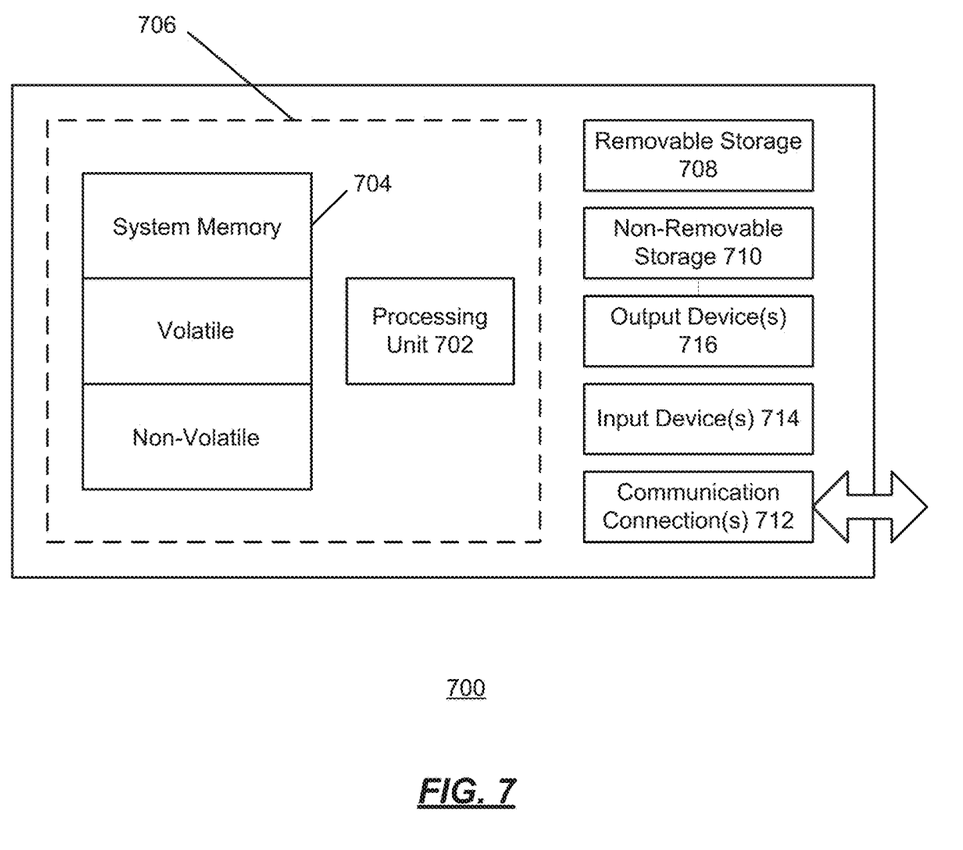
FIG. 7 shows an exemplary computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random-access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of tangible computer readable media. Computer readable media can be any available tangible media that can be accessed by device 700 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Returning to FIG. 1, agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, real-time video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent, queue and contact center performance. Unified messaging (UM) applications include various messaging and communications media (voicemail, email, SMS, fax, video, etc.) stored in a common repository and accessed by users via multiple devices through a single unified interface.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer implemented method to manage routing load of a call-center agent, the method comprising:
providing, by a processor of a first computing device, agent capacity configuration defined in a multi-dimensional capacity model for omni-channel interaction with a customer, wherein the multi-dimensional capacity model includes a first model state, a second model state, a third model state, and a fourth model state wherein the first model state is associated with an agent or agent profile, the second model state associated with a contact-center communication type available for an agent-customer interaction, the third model state associated with an associated device for the contact-center communication type, and the fourth model state associated with a degree of occupancy for the first model state, the second model state, and the third model state;
determining, by the processor, an available agent interaction capacity value for an agent using the multi-dimensional capacity model;
determining, by the processor, a channel type in a request for an agent interaction; and
routing, by the processor and based at least in part on the channel type, the request for an agent interaction to the agent when the determined available interaction capacity value for the agent at least meets an estimated capacity requirement for the interaction.

2. The computer implemented method of claim 1, wherein the available interaction capacity value for the agent is determined by summing a plurality of capacity values of current interactions assigned to the agent.

3. The computer implemented method of claim 2, wherein the plurality of capacity values of current interactions assigned to the agent is defined, at least by, a first, second, and third state in the multi-dimensional capacity model for the agent.

4. The computer implemented method of claim 2, wherein the plurality of capacity values of current interactions assigned to the agent is defined, at least by, a first, second, third, and fourth state in the multi-dimensional capacity model for the agent.

5. The computer implemented method of claim 1, wherein the multi-dimensional capacity model includes a fifth model state, the fifth model state being associated with an activity or task.

6. The computer implemented method of claim 1, wherein the second model state associated with the contact-center communication type available for the agent-customer interaction includes a first parameter associated with an interaction between the agent and the customer and a second parameter associated with a wrap-up activity following the interaction between the agent and the customer.

7. The computer implemented method of claim 6, wherein the second parameter associated with a wrap-up activity includes an occupancy value associated with data entry of customer notes for the interaction.

8. The computer implemented method of claim 1, wherein the contact-center communication type available for the agent-customer interaction includes a voice interaction channel, a SMS interaction channel, an email interaction channel, a messaging client interaction channel, and a database interaction channel.

9. The computer implemented method of claim 8, wherein the database interaction channel is associated with interaction with a customer relation management (CRM) database.

10. A system to manage routing load of a call-center agent, the system comprising:
a processor; and
a memory having instructions stored thereon, wherein execution of the instructions by the processor, cause the processor to:
retrieve agent capacity configuration defined in a multi-dimensional capacity model for omni-channel interaction with a customer, wherein the multi-dimensional capacity model includes a first model state, a second model state, a third model state, and a fourth model state wherein the first model state is associated with an agent or agent profile, the second model state associated with a contact-center communication type available for an agent-customer interaction, the third model state associated with an associated device for the contact-center communication type, and the fourth model state associated with a degree of occupancy for the first model state, the second model state, and the third model state;
determine an available agent interaction capacity value for an agent using the multi-dimensional capacity model;
determine a channel type in a request for an agent interaction; and
route, based at least in part on the channel type, the request for an agent interaction to the agent when the determined available interaction capacity value for the agent at least meets an estimated capacity requirement for the interaction.

11. The system of claim 10, wherein the available interaction capacity value for the agent is determined by summing a plurality of capacity values of current interactions assigned to the agent.

12. The system of claim 11, wherein the plurality of capacity values of current interactions assigned to the agent is defined, at least by, a first, second, and third state in the multi-dimensional capacity model for the agent.

13. The system of claim 11, wherein the plurality of capacity values of current interactions assigned to the agent is defined, at least by, a first, second, third, and fourth state in the multi-dimensional capacity model for the agent.

14. The system of claim 10, wherein the multi-dimensional capacity model includes a fifth model state, the fifth model state being associated with an activity or task.

15. The system of claim 10, wherein the second model state associated with the contact-center communication type available for the agent-customer interaction includes a first parameter associated with an interaction between the agent and the customer and a second parameter associated with a wrap-up activity following the interaction between the agent and the customer.

16. The system of claim 10, wherein the system comprises a routing engine in a contact center.

17. The system of claim 10, wherein the contact-center communication type available for the agent-customer interaction includes a voice interaction channel, a SMS interaction channel, an email interaction channel, a messaging client interaction channel, and a database interaction channel.

18. The system of claim 15, wherein the second parameter associated with a wrap-up activity includes an occupancy value associated with data entry of customer notes for the interaction.

19. The system of claim 17, wherein the database interaction channel is associated with interaction with a customer relation management (CRM) database.

20. A non-transitory computer readable medium to manage routing load of a call-center agent, the computer readable medium comprising instructions stored thereon, wherein execution of the instructions by a processor, cause the processor to:
- retrieve agent capacity configuration defined in a multi-dimensional capacity model for omni-channel interaction with a customer, wherein the multi-dimensional capacity model includes a first model state, a second model state, a third model state, and a fourth model state wherein the first model state is associated with an agent or agent profile, the second model state associated with a contact-center communication type available for an agent-customer interaction, the third model state associated with an associated device for the contact-center communication type, and the fourth model state associated with a degree of occupancy for the first model state, the second model state, and the third model state;
- determine an available agent interaction capacity value for an agent using the multi-dimensional capacity model;
- determine a channel type in a request for an agent interaction; and
- route, based at least in part on the channel type, the request for an agent interaction to the agent when the determined available interaction capacity value for the agent at least meets an estimated capacity requirement for the interaction.

* * * * *